(12) United States Patent
Hongo

(10) Patent No.: US 9,386,200 B2
(45) Date of Patent: Jul. 5, 2016

(54) CAMERA MODULE AND ELECTRONIC DEVICE FOR COOLING IMAGE SENSOR

(71) Applicant: Sony Corporation, Tokyo (JP)

(72) Inventor: Kazuhiro Hongo, Kanagawa (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 13/955,703

(22) Filed: Jul. 31, 2013

(65) Prior Publication Data

US 2014/0055670 A1   Feb. 27, 2014

(30) Foreign Application Priority Data

Aug. 27, 2012 (JP) ................................. 2012-186140

(51) Int. Cl.
*F03G 7/06* (2006.01)
*H05K 7/00* (2006.01)
*H04N 5/225* (2006.01)

(52) U.S. Cl.
CPC .................................. *H04N 5/2253* (2013.01)

(58) Field of Classification Search
CPC ....................................................... G03B 17/04
USPC .............................................. 348/374, 207.99
See application file for complete search history.

(56) References Cited

U.S. PATENT DOCUMENTS

| | | | |
|---|---|---|---|
| 2002/0195326 A1* | 12/2002 | Hunter et al. ................. | 200/181 |
| 2006/0038183 A1* | 2/2006 | Oliver ............................ | 257/79 |
| 2007/0002546 A1* | 1/2007 | Nomura et al. ............... | 361/748 |
| 2007/0280668 A1* | 12/2007 | Kubo et al. .................... | 396/133 |
| 2011/0173970 A1* | 7/2011 | Torres-Jara ............... | F03G 7/06 60/528 |

FOREIGN PATENT DOCUMENTS

| | | |
|---|---|---|
| JP | 2006-148299 | 6/2006 |
| JP | 2008-311925 | 12/2008 |

* cited by examiner

*Primary Examiner* — Joel Fosselman
(74) *Attorney, Agent, or Firm* — Chip Law Group

(57) ABSTRACT

There is provided a camera module including an image sensor unit that is configured to include an image sensor and a mounting board, a sheet-shaped heat radiation member that comes into contact with a part of the image sensor unit and a component other than the image sensor unit and is elastically deformed so that an imaging surface of the image sensor unit is moved, and an actuator that elastically deforms the sheet-shaped heat radiation member so that the imaging surface of the image sensor unit is moved.

16 Claims, 20 Drawing Sheets

A

B

CAMERA MODULE AND ELECTRONIC DEVICE FOR COOLING IMAGE SENSOR

BACKGROUND

The present technology relates to a camera module and an electronic device, and more particularly to, a camera module and an electronic device capable of efficiently cooling an image sensor, while configuring an image sensor unit to be movable.

An imaging device configured as a digital camera or the like includes a camera shake correction mechanism that shifts the position of an image sensor unit including an image sensor and a lowpass filter (optical filter) to perform camera shake correction at the time of photography.

In an imaging device such as a digital single-lens reflex camera, dust may penetrate into its camera body and thus may be attached to the surface of a lowpass filter on an image sensor, for example, when a lens is exchanged. Therefore, as a dust removing countermeasure against the attached dust, there is a countermeasure of brushing off the dust attached to the lowpass filter by activating the above-described camera shake correction mechanism and driving (vibrating) the image sensor unit in a reciprocation manner (for example, see Japanese Unexamined Patent Application Publication No. 2008-311925).

Further, a technology for moving an image sensor in an optical axis direction perpendicular to an imaging surface has been suggested (for example, see Japanese Unexamined Patent Application Publication No. 2006-148299).

For example, in a monitoring camera device that performs monitoring during the night and the day, an optical path length differs between a case in which photography is performed using visible light during the day and a case in which photography is performed using infrared light during the night depending on whether there is an infrared cutoff filter. Therefore, by automatically moving the image sensor unit in the optical axis direction and correcting the difference in the optical path length at the time of the photography using the visible light and the infrared light described above, it is possible to realize the monitoring camera device capable of obtaining a focused and sharp image regardless of the night and the day.

SUMMARY

In the related art, however, a countermeasure relevant to cooling of an image sensor is not sufficiently considered. That is, although the functions of image sensors improve, power consumption increases, and thus an amount of heat generation tends to increase, the cooling is performed mainly only by exhausting heat to the air in the related art.

For example, in the technology of Japanese Unexamined Patent Application Publication No. 2008-311925, in order to activate the image sensor unit in a specific direction with reference to a camera housing, the image sensor unit is configured to be connected to the housing body of the camera via an actuator and a member with a small contact area on an axis.

Therefore, it is difficult to diffuse heat generated in the image sensor unit to the housing body and dissipate the heat. Further, since the materials of components included in the actuator are limited, optimization of the heat transfer is also difficult. Accordingly, for example, there is a problem that the number of components increases due to necessity, for example, to provide a heat radiation plate on the rear surface of the image sensor, and thus, for example, it is difficult to ensure an attachment space.

For example, in the technology of Japanese Unexamined Patent Application Publication No. 2006-148299, in order to avert the imaging surface and adjust movable rigidity, the image sensor unit is configured to be connected to the housing body of the camera via a pivoting portion and a movable portion having a small cross-sectional area. Accordingly, it is difficult to diffuse heat generated in the image sensor unit to the housing body and dissipate the heat.

Thus, in the configuration in which the image sensor unit is moved in the related art, the heat exhaust of the image sensor may be said not to be sufficient. Moreover, an operation failure may be caused at a temperature exceeding an operation ensuring temperature due to high heat resistance, or generation of noise such as a dark current may be caused in some cases. There is a problem that the deterioration in the function of the image sensor unit caused due to the heat may be more considerable with future high density of the pixels and high-speed processing of image data.

It is desirable to provide a technology for efficiently cooling an image sensor while configuring an image sensor unit to be movable.

According to a first embodiment of the present technology, there is provided a camera module including an image sensor unit that includes an image sensor and a mounting board, a sheet-shaped heat radiation member that comes into contact with a part of the image sensor unit and a component other than the image sensor unit and is elastically deformed so that an imaging surface of the image sensor unit is moved, and an actuator that elastically deforms the sheet-shaped heat radiation member so that the imaging surface of the image sensor unit is moved.

The sheet-shaped heat radiation member may be folded line-symmetrically with reference to an axis parallel to an optical axis of light incident on the imaging surface.

An incision may be formed in a part of the sheet-shaped heat radiation member.

The component other than the image sensor unit may be a motherboard including a signal processing circuit.

The component other than the image sensor unit may be a lens barrel including an optical lens.

The actuator may be disposed on a rear surface side of the imaging surface of the image sensor unit.

The actuator may be a shape-memory alloy or a polymer actuator performing a curvature operation in a thickness direction of the actuator.

The actuator may be divided into a plurality of actuators on a surface parallel to the imaging surface of the image sensor unit and the divided actuators may be independently driven.

The mounting board may be electrically connected to a board different from the mounting board via a flexible board.

The camera module may further include a wireless communication unit that wirelessly transmits and receives some of signals transmitted and received between the mounting board and the board different from the mounting board.

According to a second embodiment of the present technology, there is provided an electronic device including a camera module that includes an image sensor unit that includes an image sensor and a mounting board, a sheet-shaped heat radiation member that comes into contact with a part of the image sensor unit and a component other than the image sensor unit and is elastically deformed so that an imaging surface of the image sensor unit is moved, and an actuator that elastically deforms the sheet-shaped heat radiation member so that the imaging surface of the image sensor unit is moved.

According to the first and second embodiments of the present technology, the sheet-shaped heat radiation member that comes into contact with the part of the image sensor unit configured to include the image sensor and the mounting board and the component other than the image sensor unit and is elastically deformed to move the imaging surface of the image sensor unit is elastically deformed, and thus the imaging surface of the image sensorunit is moved.

According to embodiments of the present technology, it is possible to efficiently cool an image sensor while configuring an image sensor unit to be movable.

DETAILED DESCRIPTION OF THE EMBODIMENTS

Figure 1:
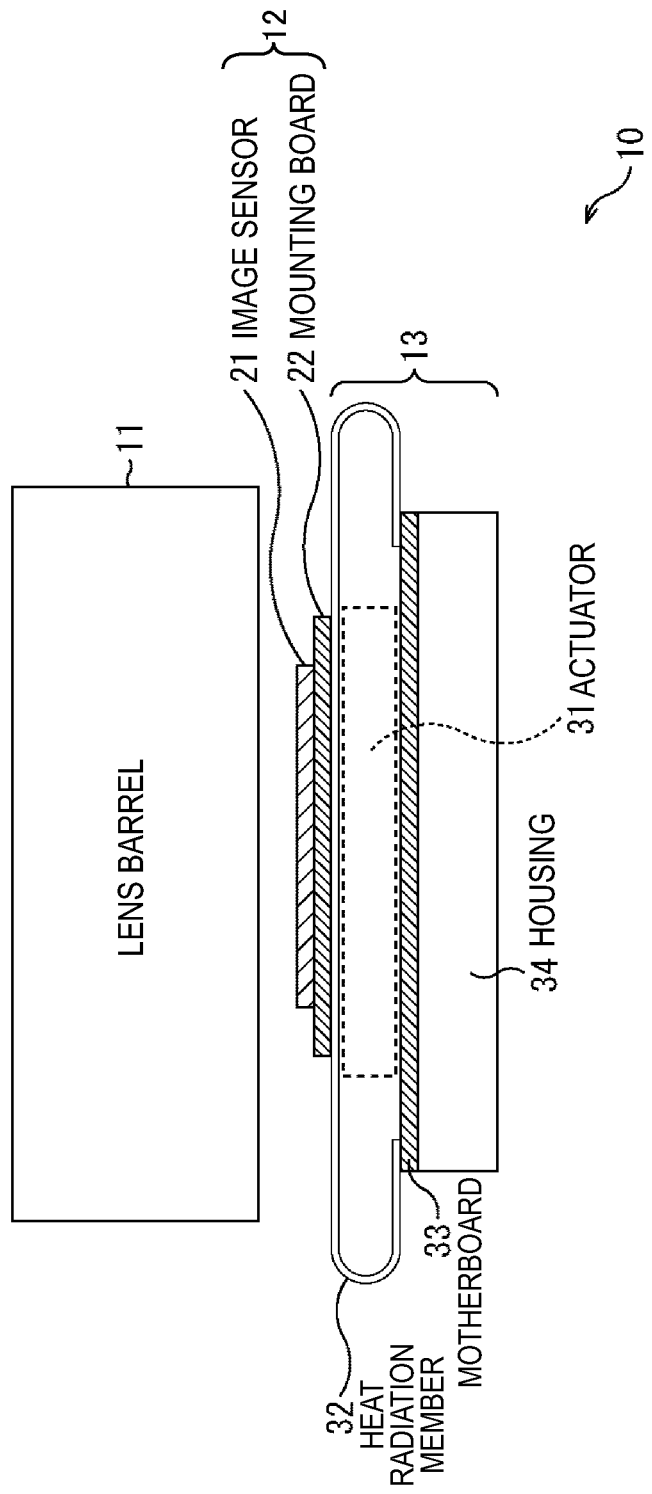
FIG. 1 is a side view illustrating an example of a configuration according to an embodiment of a camera module to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology to be disclosed here will be described with reference to the drawings.

FIG. 1 is a side view illustrating an example of a configuration according to an embodiment of a camera module to which the present technology is applied. A camera module 10 is included in, for example, a digital camera, a cellular phone, or a smart phone and has a function of capturing an image. The camera module 10 corresponds to, for example, a camera shake correction function, and thus can cause an actuator to shift the position of an image sensor unit, as will be described below.

The camera module 10 illustrated in the drawing includes a lens barrel 11, an image sensor unit 12, and a housing unit 13.

The lens barrel 11 is a tubular component in which an optical lens is disposed. Light condensed by the optical lens inside the lens barrel 11 is imaged on the surface of the image sensor unit 12, and an image is photographed.

The image sensor unit 12 includes an image sensor 21 and a mounting board 22. The image sensor 21 includes, for example, a CMOS image sensor or a CCD image sensor and is disposed on the mounting board 22 in which a timing generation circuit and the like are installed. The image sensor and the mounting board are electrically connected by, for example, wire bonding, solder joining, or bump joining of a conductive material such as Au. The surface of the image sensor 21 on the upper side of the drawing is assumed to be an imaging surface. The image sensor receives the light condensed by the optical lens inside the lens barrel 11 in the imaging surface and performs photoelectric conversion.

The housing unit 13 includes an actuator 31, a heat radiation member 32, a motherboard 33, and a housing 34.

The actuator 31 is fixed to the motherboard 33, includes, for example, a VCM, a piezo, a stepping motor, a shape-memory allow, or a polymer actuator, and moves the image sensor unit 12 in the vertical direction of the drawing. The upper surface of the actuator 31 in the drawing comes into contact with the heat radiation member 32 and is configured such that the heat radiation member 32 is elastically deformed when the image sensor unit 12 is moved in the vertical direction of the drawing.

A shape-memory alloy or a polymer actuator performing a curvature operation in a thickness direction is suitable as the actuator installed in the region with a large area and a narrow gap, as illustrated in FIG. 1. This is because the shape-memory alloy or the polymer actuator is easily formed to be thin and is easily disposed in a region with a large area and a narrow gap since an amount of displacement and a driving force can be sufficiently obtained by enlarging a large surface area.

The heat radiation member 32 is formed in a sheet shape using a material which has high heat conductivity and is elastically deformable. For example, a graphite sheet, a metal sheet, a compound member sheet formed of a resin and metal, or the like is used as the material which has high heat conductivity and is elastically deformable. In the example of FIG. 1, the lower surface of the mounting board 22 in the drawing comes into contact with the sheet-shaped heat radiation member 32.

The sheet-shaped heat radiation member 32 is disposed to surround the actuator 31. That is, the sheet-shaped heat radiation member 32 is folded gently in the left end portion and the right end portion in the drawing. That is, the heat radiation member 32 is folded inward line-symmetrically with reference to an axis in the vertical direction (an optical axis direction of the light incident on the imaging surface) in the middle of the drawing. Further, the end portions on both right and left end sides of the sheet-shaped heat radiation member 32 are disposed to come into contact with the motherboard 33.

By disposing the heat radiation member 32 in this way, it is possible to exhaust the heat of the image sensor unit 12 to the motherboard 33 and the housing 34 via the heat radiation member 32. Further, it is possible to elastically deform the heat radiation member 32 with movement of the actuator 31.

The motherboard 33 is, for example, a board in which a signal processing circuit relevant to an image signal or the like is installed. The motherboard is disposed to be fixed onto the housing 34.

Figure 2:
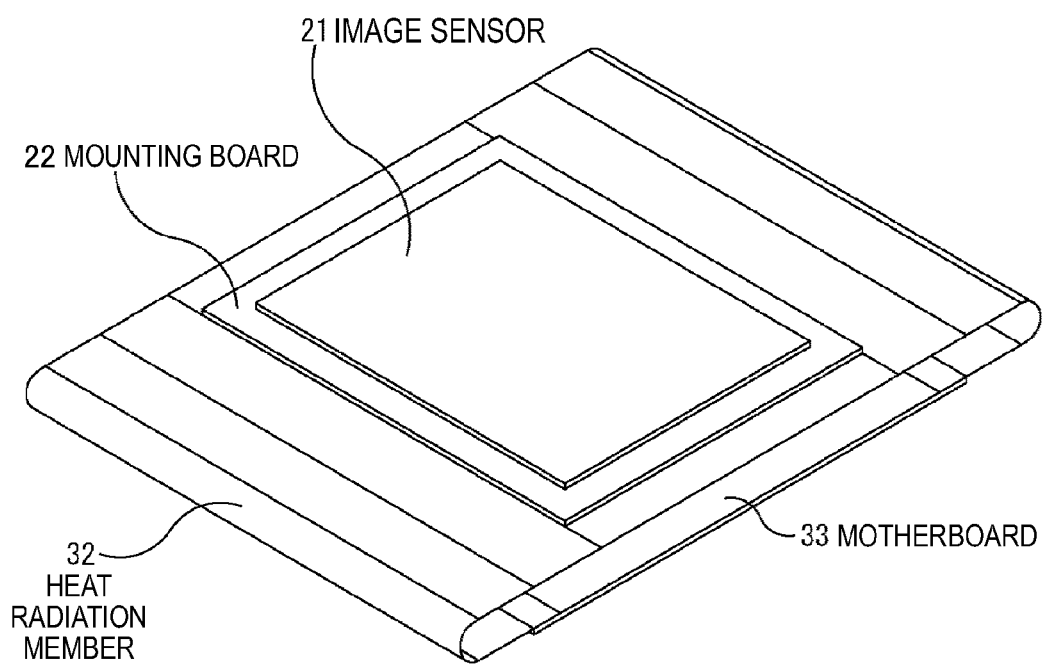
FIG. 2 is a diagram illustrating an image sensor unit, a heat radiation member, and a motherboard when viewed from the upper direction of FIG. 1.

FIG. 2 is a diagram illustrating the image sensor unit 12, the heat radiation member 32, and the motherboard 33, when viewed from the upper direction of FIG. 1.

As described above, the sheet-shaped heat radiation member 32 which comes into contact with the lower surface (rear surface) of the mounting board 22 is disposed to come into contact with the motherboard 33 in the end portions of both the right and left sides. Although not illustrated in the drawing, the actuator 31 is disposed to be surrounded by the inside of the heat radiation member 32 at a position below the mounting board 22.

Figure 3:
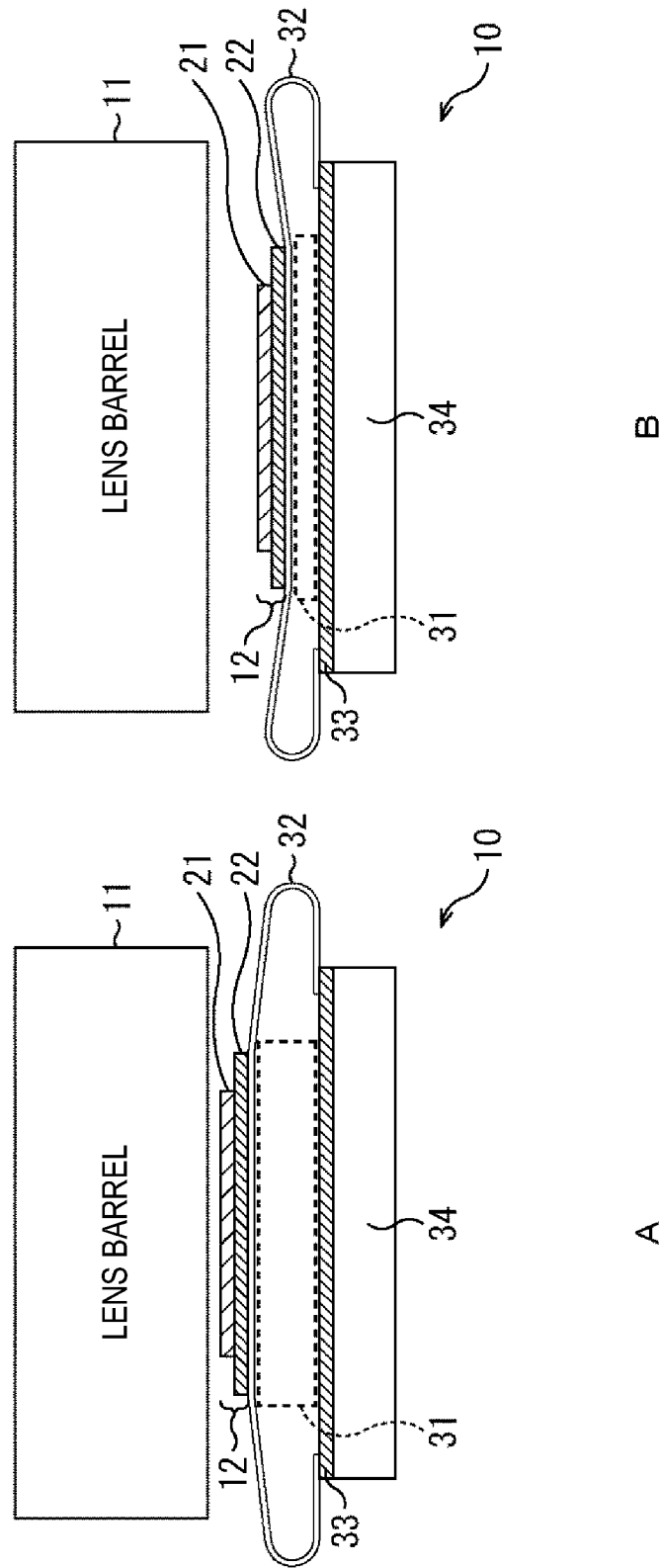
FIGS. 3A and 3B are diagrams illustrating movement of the image sensor unit in the camera module when an actuator is driven.

FIGS. 3A and 3B are diagrams illustrating movement of the image sensor unit 12 in the camera module 10, when the actuator 31 is driven.

FIG. 3A illustrates a case in which the position of the image sensor unit 12 is shifted in a closer direction to the lens barrel 11 when the actuator 31 is expanded in the vertical direction of the drawing. FIG. 3B illustrates a case in which the position of the image sensor unit 12 is shifted in a distant direction from the lens barrel 11 when the actuator 31 is contracted in the vertical direction of the drawing.

In either FIG. 3A or 3B, the heat radiation member 32 is elastically deformed with the expansion and contraction of the actuator 31.

Thus, according to an embodiment of the present technology, the heat of the image sensor unit 12 can be exhausted via the heat radiation member 32. Moreover, the driving of the actuator 31 can be configured not to be interrupted.

When the actuator 31 is driven, for example, as described above with reference to FIGS. 3A and 3B, the heat radiation member 32 is elastically deformed with the expansion and contraction of the actuator 31. Accordingly, a driving force for elastically deforming the heat radiation member 32 is necessary in the actuator 31.

For example, when the driving force of the actuator 31 is not sufficiently large, the rigidity of the heat radiation member 32 may be adjusted. For example, as illustrated in FIG. 4, the rigidity of the heat radiation member 32 can be reduced by configuring the heat radiation member 32.

Figure 4:
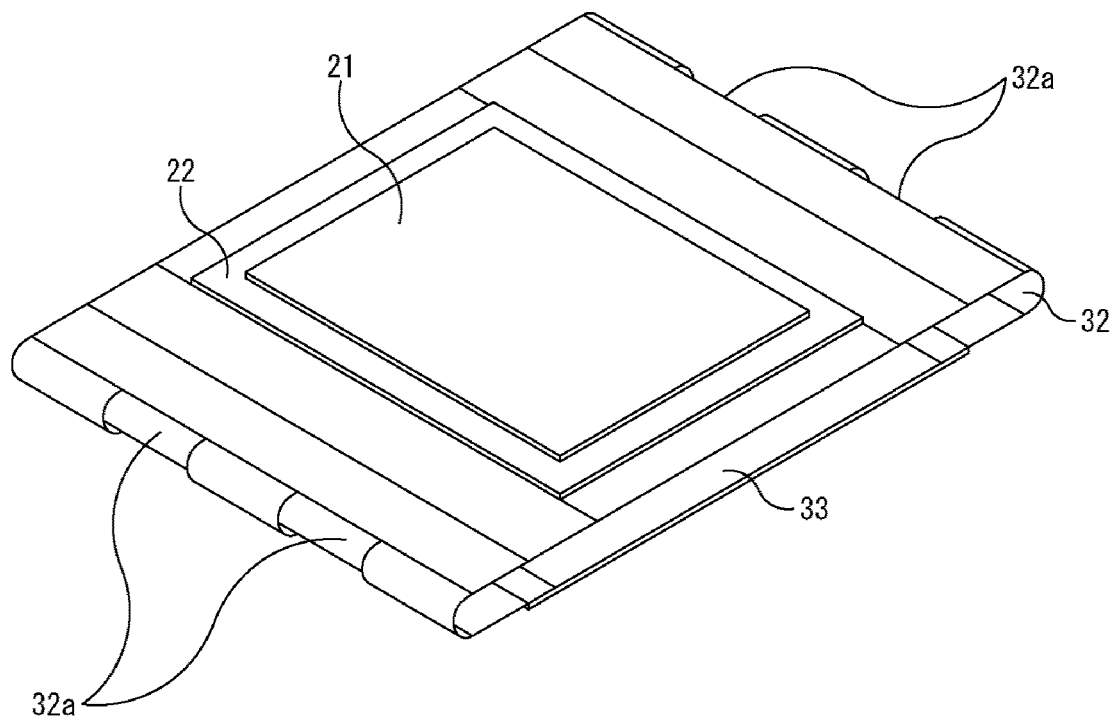
FIG. 4 is a diagram illustrating another example of the image sensor unit, the heat radiation member, and the motherboard when viewed from the upper direction of FIG. 1.

FIG. 4 is a diagram illustrating another example of the image sensor unit 12, the heat radiation member 32, and the motherboard 33 when viewed from the upper direction of FIG. 1. The example of FIG. 4 is different from the example of FIG. 2 in that incisions 32a are formed in portions in which the sheet-shaped heat radiation member 32 is folded. Thus, the rigidity of the heat radiation member 32 can be reduced by cutting off portions in which the amount of deformation is the largest when the heat radiation member 32 is elastically deformed.

In the example described above with reference to FIGS. 1 to 3B, the heat radiation member 32 has been disposed in a bilaterally symmetrical shape. However, the heat radiation member 32 may be disposed in a bilaterally unsymmetrical shape. An example in which the heat radiation member 32 is disposed in the bilaterally unsymmetrical shape will be illustrated in FIGS. 5A and 5B.

Figure 5:
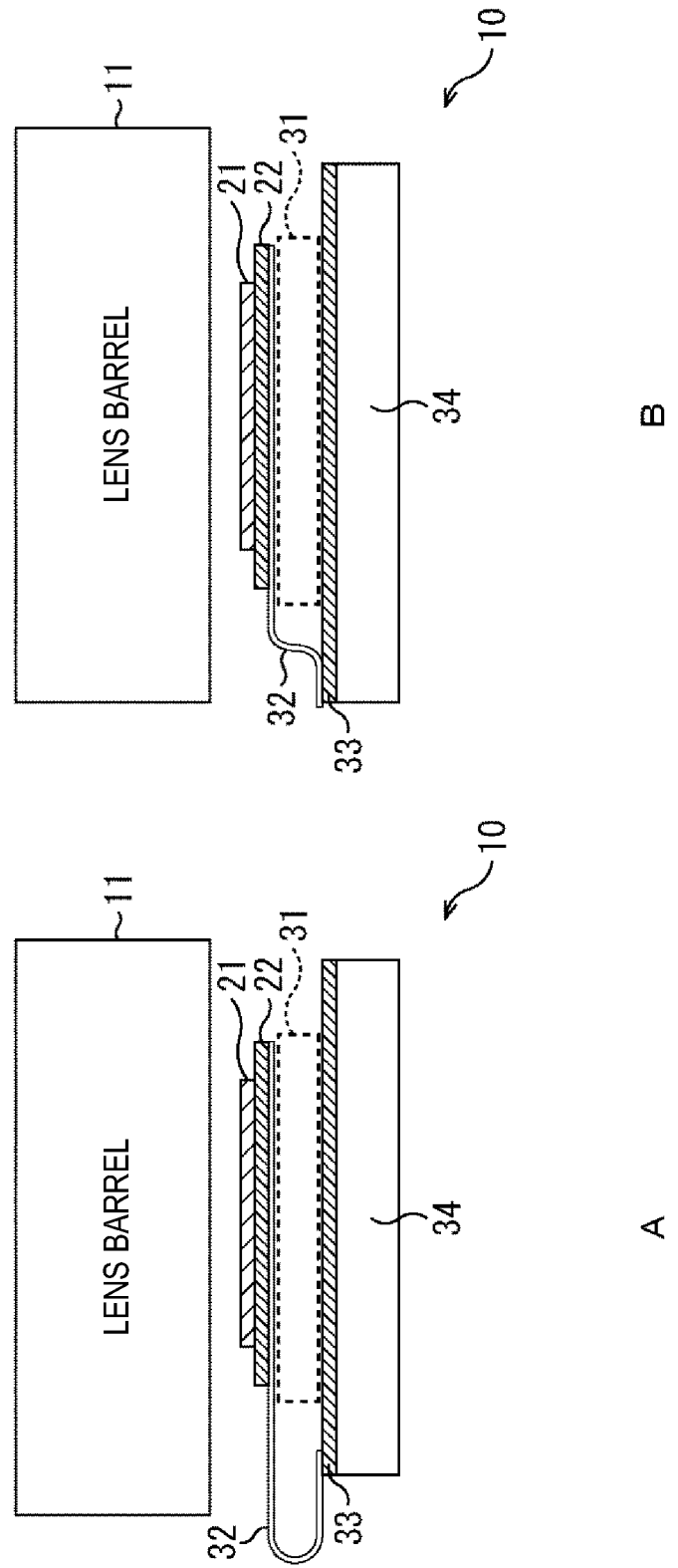
FIGS. 5A and 5B are side views illustrating another example of the configuration of a camera module to which an embodiment of the present technology is applied.

FIGS. 5A and 5B are side views illustrating another example of the configuration of the camera module 10 to which the present technology is applied. The example of FIGS. 5A and 5B is different from the example of FIG. 1 in that the heat radiation member 32 is disposed in the bilaterally unsymmetrical shape. Since the remaining configuration of FIGS. 5A and 5B is the same as that of FIG. 1, the detailed description will be omitted.

The configuration illustrated in FIG. 5A is different from that of FIG. 1 in that a right end portion of the sheet-shaped heat radiation member 32 in the drawing is cut off. That is, in the example of FIG. 5A, the lower surface of the mounting board 22 in the drawing comes into contact with the sheet-shaped heat radiation member 32. Moreover, the sheet-shaped heat radiation member 32 is disposed to surround the actuator 31. That is, in the sheet-shaped heat radiation member 32, the left end portion in the drawing is gently folded inward (to the right side in the drawing). The end portion of the left side of the sheet-shaped heat radiation member 32 is disposed to come into contact with the motherboard 33.

The configuration illustrated in FIG. 5B is different from that of FIG. 1 in that a right end portion of the sheet-shaped heat radiation member 32 in the drawing is cut off and a left end portion in the drawing is folded in another direction. That is, in the example of FIG. 5B, the lower surface of the mounting board 22 in the drawing comes into contact with the sheet-shaped heat radiation member 32. Moreover, the sheet-shaped heat radiation member 32 is disposed to surround the actuator 31. That is, in the sheet-shaped heat radiation member 32, the left end portion in the drawing is gently folded outward (to the left side in the drawing). The end portion of the left side of the sheet-shaped heat radiation member 32 is disposed to come into contact with the motherboard 33.

By configuring the camera module 10 as in FIGS. 5A and 5B, the heat of the image sensor unit 12 can be exhausted via the heat radiation member 32. Moreover, the driving of the actuator 31 can be configured not to be interrupted. By reducing the amount of use of the heat radiation member 32, cost can also be reduced. By cutting off the right end portion of the sheet-shaped heat radiation member 32 in the drawing, a large component can be mounted on a right portion of the motherboard 33 in the drawing, and thus the degree of freedom of design can be improved.

When the case of the configuration illustrated in FIGS. 5A and 5B is compared to the case of the configuration illustrated in FIG. 1, there is a probability that the actuator 31 may be inclined in the right and left oblique directions of the image sensor unit 12 at the time of the driving of the actuator 31. Thus, stability of the imaging surface may be inferior at the time of the driving of the actuator 31. Moreover, when the case of the configuration illustrated in FIGS. 5A and 5B is compared to the case of the configuration illustrated in FIG. 1, heat exhaust efficiency may be lower due to the fact that the contact area of the heat radiation member 32 with the motherboard 33 is reduced.

In the case of the configuration illustrated in FIG. 5B, a parallel link type in which the imaging surface is moved substantially in parallel can also be used.

Figure 6:
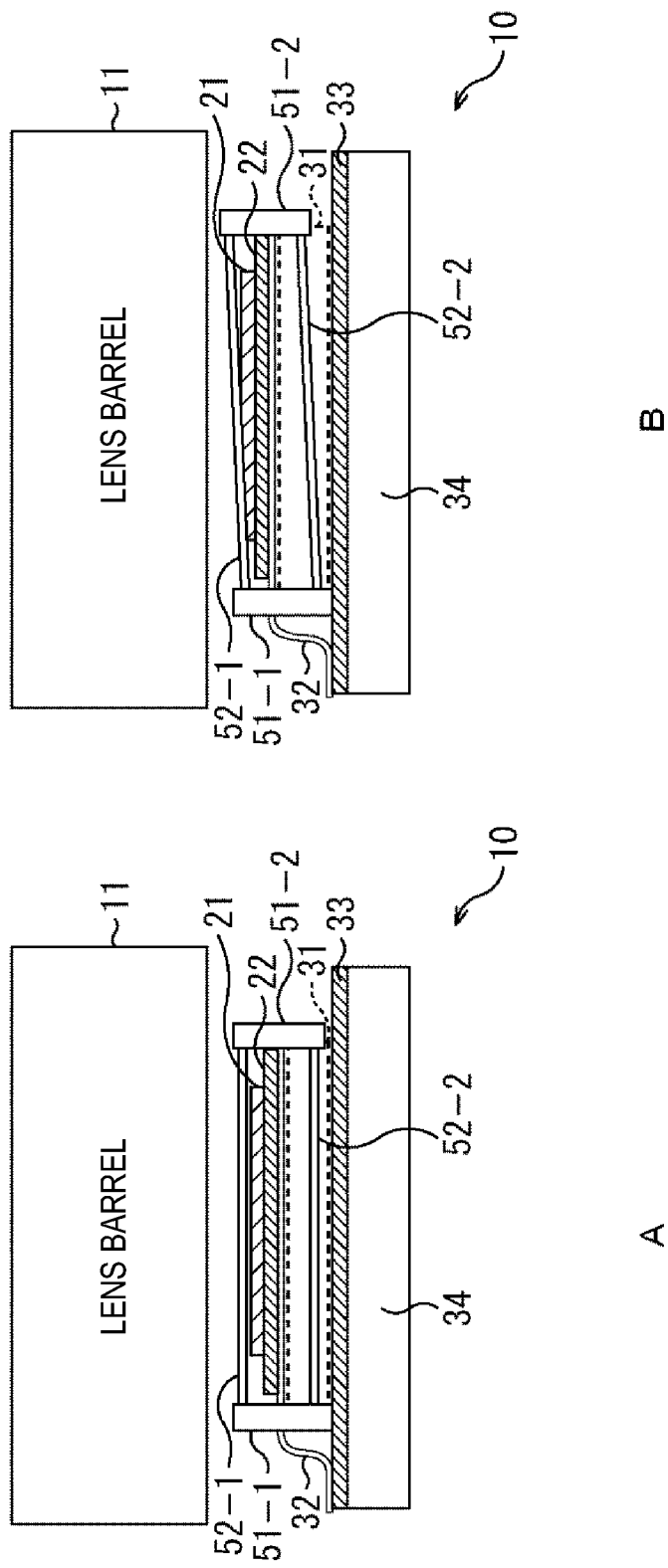
FIGS. 6A and 6B are side views illustrating an example of a configuration of a camera module to which an embodiment of the present technology is applied when a parallel link type is used.

FIGS. 6A and 6B are side views illustrating an example of the configuration of the camera module 10 to which the present technology is applied when the parallel link type is used.

In the parallel link type, as illustrated in FIG. 6A, pillars 51-1 and 51-2 are disposed at both right and left ends of the image sensor unit 12 in the drawing, respectively. Connection members 52-1 and 52-2 that are connected to the pillars 51-1 and 51-2 and extend in the horizontal direction in the drawing are installed. The pillars 51-1 and 51-2 are configured as members with relatively high rigidity and the connection members 52-1 and 52-2 are configured as members with relatively low rigidity. The end portion of the right side of the mounting board 22 in the drawing is adhered to the pillar 51-2, and thus the mounting board 22 is perpendicularly fixed to the pillar 51-2.

In the parallel link type, the pillar 51-2 is configured to be normally moved in parallel to the pillar 51-1 when the actuator 31 is driven. Therefore, when the actuator 31 is expanded in the vertical direction in the drawing, as illustrated in FIG. 6B, the pillar 51-2 is moved in parallel to the pillar 51-1 in the upper direction in the drawing. Accordingly, since the mounting board 22 is also moved perpendicularly to the pillar 51-2 in the upper direction in the drawing, the imaging surface of the image sensor 21 is stably moved in the optical axis direction.

In the example described above with reference to FIG. 1, the image sensor 21 and the mounting board 22 are connected on the rear surface of the imaging surface of the image sensor. However, the image sensor 21 and the mounting board 22 may be connected on the imaging surface side of the image sensor.

Figure 7:
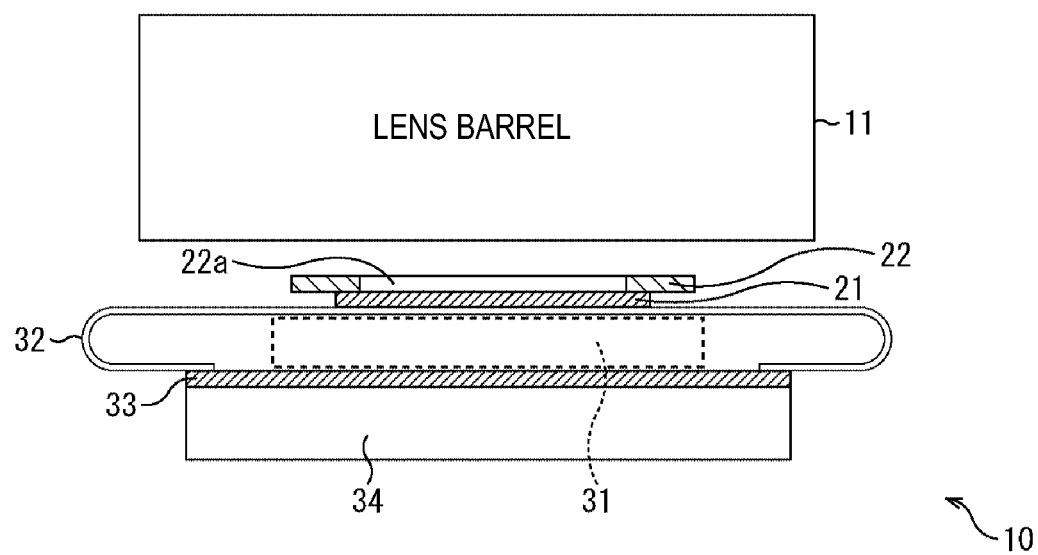
FIG. 7 is a side view illustrating an example of a configuration of a camera module to which an embodiment of the present technology is applied when the image sensor is connected to the mounting board and the imaging surface side.

FIG. 7 is a side view illustrating an example of the configuration of the camera module 10 to which the present technology is applied when the imaging is connected to the mounting board on the imaging surface side.

The case of the configuration illustrated in FIG. 7 is different from the case of the configuration illustrated in FIG. 1 in that the mounting board 22 is disposed on the upper side (the imaging surface side) of the image sensor 21 in the drawing and an opening portion 22a is formed in the mounting board 22 at a position corresponding to the imaging surface of the image sensor 21. In the case of FIG. 7, electrode pads of the image sensor 21 and electrode pads of the mounting board 22 are connected by, for example, solder joining or bump joining of a conductive material such as Au. Since the remaining configuration in FIG. 7 is the same as that of the case of FIG. 1, the detailed description will be omitted.

The example in which the heat of the image sensor unit 12 is exhausted to the motherboard 33 and the housing 34 disposed on the lower side (rear surface side) of the mounting board 22 has been described above. However, for example, the heat of the image sensor unit 12 may be exhausted to the lens barrel 11.

Figure 8:
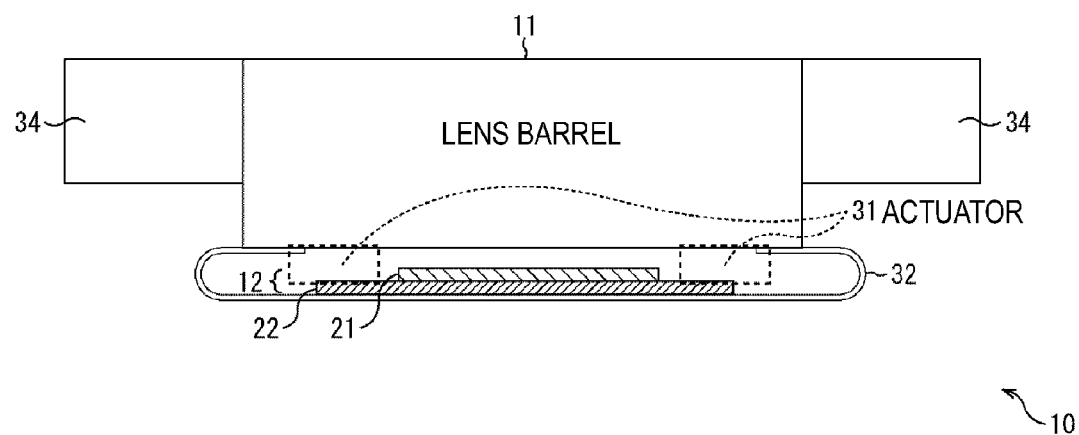
FIG. 8 is a side view illustrating an example of a configuration of a camera module to which an embodiment of the present technology is applied when heat is exhausted to the lens barrel.

FIG. 8 is a side view illustrating an example of the configuration of the camera module 10 to which the present technology is applied when the heat of the image sensor unit 12 (the image sensor 21 and the mounting board 22) is exhausted to the lens barrel 11.

The case of the configuration illustrated in FIG. 8 is different from the case of the configuration illustrated in FIG. 1 in that the housing 34 is installed such that the lens barrel 11 is interleaved. The right and left end portions of the sheet-shaped heat radiation member 32 in the drawing are gently folded upward. The end portions of both the right and left sides of the sheet-shaped heat radiation member 32 are disposed to come into contact with the lens barrel 11.

The case of the configuration illustrated in FIG. 8 is different from the case of the configuration illustrated in FIG. 1 in that the lower side of the actuator 31 in the drawing comes into contact with the upper surface (front surface) of the mounting board 22, and the upper side of the actuator 31 in the drawing comes into contact with the lower surface of the lens barrel. That is, in the case of the configuration illustrated in FIG. 8, the heat of the image sensor unit 12 is exhausted to the lens barrel 11 and the housing 34 via the heat radiation member 32.

When the camera module 10 is configured as in FIG. 8, it is necessary to divide and dispose the actuator 31 to the right and left or to dispose the actuator 31 in a circular form so that light condensed by the optical lens inside the lens barrel is received on the imaging surface of the image sensor 21.

The case of the configuration illustrated in FIG. 8 is different from the case of the configuration illustrated in FIG. 1 in that the motherboard 33 is not illustrated.

For example, when components or the like disposed on the rear surface of the image sensor unit 12 are not suitable for the heat exhaust or when the motherboard 33 is desired to be disposed at a position distant from the image sensor unit 12, the configuration illustrated in FIG. 8 may be used. Further, even when a space is not sufficiently ensured below the lens barrel 11, the configuration illustrated in FIG. 8 may be used. By using the configuration illustrated in FIG. 8, for example, a space can be designed to be saved to the extent of the thickness of the actuator 31 and the motherboard 33, compared to the case of FIG. 1.

In the case of the configuration illustrated in FIG. 8, the heat of the image sensor unit 12 can also be exhausted via the heat radiation member 32. Moreover, the driving of the actuator 31 can be configured not to be interrupted.

Figure 9:
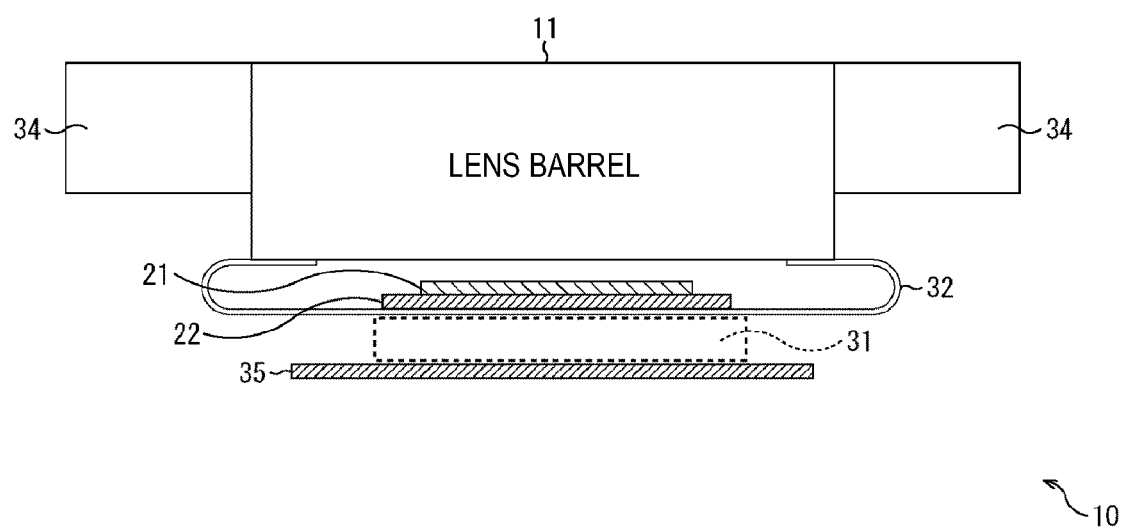
FIG. 9 is a side view illustrating another example of a configuration of a camera module to which an embodiment of the present technology is applied when heat is exhausted to the lens barrel.

When the components or the like disposed on the rear surface of the image sensor unit 12 are not suitable for the heat exhaust, but are suitable for support of the actuator, the configuration illustrated in FIG. 9 can be used.

FIG. 9 is a side view illustrating another example of the configuration of the camera module 10 to which the present technology is applied when the heat of the image sensor unit 12 (the image sensor 21 and the mounting board 22) is exhausted to the lens barrel 11.

The case of the configuration illustrated in FIG. 9 is different from the case of the configuration illustrated in FIG. 8 in that an actuator support member 35 is disposed on the rear surface of the image sensor unit 12 and the actuator 31 is disposed to be fixed onto the actuator support member 35.

By configuring the camera module 10 as in FIG. 9, for example, the restriction on the shape of the actuator 31 can be avoided. Further, the driving force of the actuator 31 can be increased according to the strength or stability of the actuator support member 35.

Figure 10:
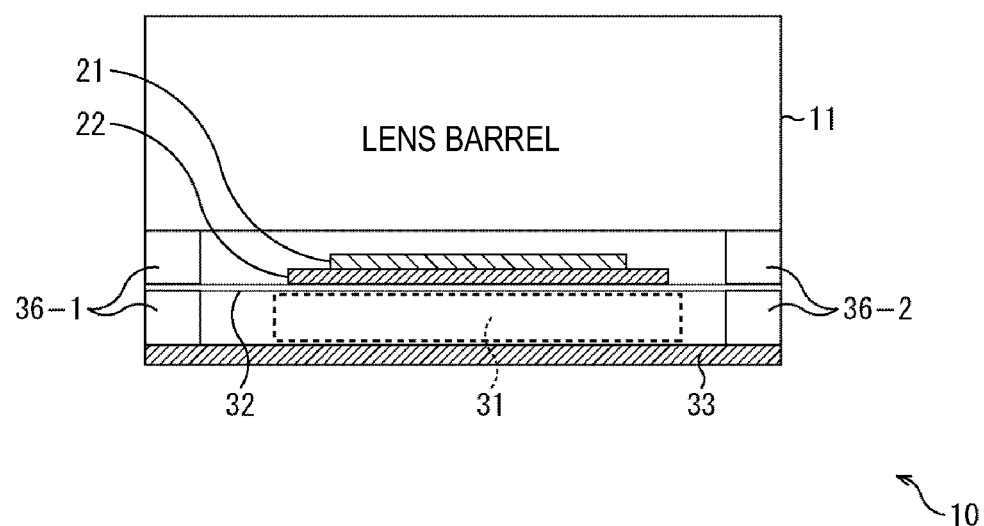
FIG. 10 is a side view illustrating still another example of a configuration of a camera module to which an embodiment of the present technology is applied.

FIG. 10 is a side view illustrating still another example of the configuration of the camera module 10 to which the present technology is applied.

The case of the configuration illustrated in FIG. 10 is different from the case of the configuration illustrated in FIG. 1 in that heat transfer members 36-1 and 36-2 are installed on both the right and left sides of the motherboard 33. Both the right and left ends of the sheet-shaped heat radiation member 32 are interposed between the heat transfer members 36-1 and 36-2.

The heat transfer members 36-1 and 36-2 are formed of, for example, an aluminum alloy or copper.

That is, in the case of the configuration illustrated in FIG. 10, the heat of the image sensor unit 12 is exhausted to the heat transfer members 36-1 and 36-2 via the heat radiation member 32. In the case of the configuration illustrated in FIG. 10, a middle portion of the heat radiation member 32 is elastically deformed so as to be raised or lowered with movement of the actuator 31. Since the remaining configuration in FIG. 10 is the same as the configuration in FIG. 1, the detailed description will be omitted.

For example, when the heat radiation member 32 is formed of, for example, a material of which a shape is rarely maintained in the folded state, the configuration illustrated in FIG. 10 may be used.

Next, the configuration of the actuator 31 will be described. As described above, a shape-memory alloy or a polymer actuator performing a curvature operation in the thickness direction is suitable as the actuator installed in a region with a large area and a narrow gap.

Figure 11:
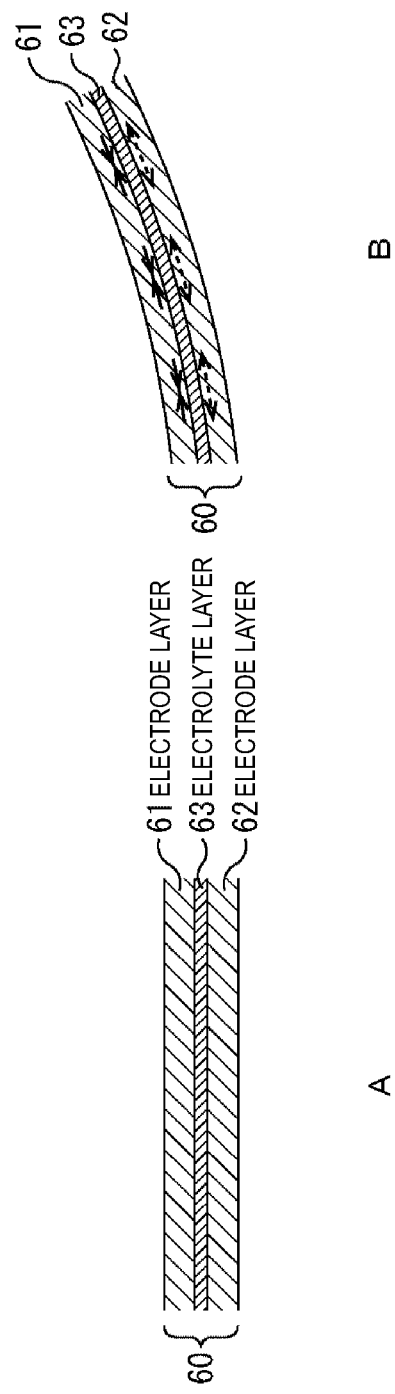
FIGS. 11A and 11B are sectional views illustrating a configuration and an operation principle of a polymer actuator.

FIGS. 11A and 11B are sectional views illustrating the configuration and an operation principle of a polymer actuator 60.

As illustrated in FIG. 11*a*, the polymer actuator 60 includes an electrode layer 61, an electrode layer 62, and an electrolyte layer 63. That is, the polymer actuator 60 includes the electrolyte layer 63 with a flat plate shape and the electrode layers 61 and 62 of which surfaces facing each other with the electrolyte layer 63 interposed therebetween are formed to be insulated from each other.

FIG. 11B illustrates an example in which the polymer actuator 60 in FIG. 11A is driven (deformed). By causing a potential difference between the electrode layers 61 and 62, ions move between the electrode layers 61 and 62 via the electrolyte layer 63. When the ions move, as illustrated in FIG. 11B, one electrode layer is contracted and the other electrode layer is expanded according to the direction of the potential. In the example of FIG. 11B, the electrode layer 61 is contracted and the electrode layer 62 is expanded.

By reversing the contraction and the expansion on both sides of the electrolyte layer 63, curvature movement in the thickness direction of the polymer actuator 60 occurs in each portion of the polymer actuator 60, as illustrated in FIG. 11B.

Figure 12:
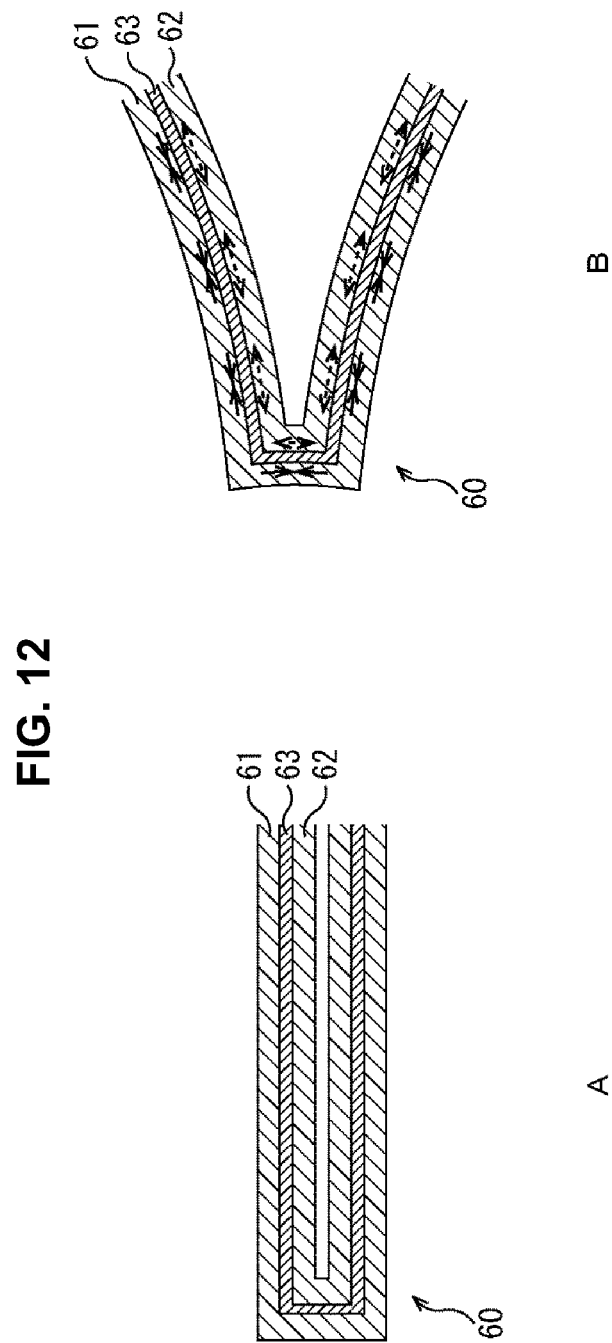
FIGS. 12A and 12B are sectional views illustrating a configuration and an operation principle of a polymer actuator when the polymer actuator with a U shape is formed.

FIGS. 12A and 12B are sectional views illustrating a configuration and an operation principle of the polymer actuator 60 when the polymer actuator 60 with a U shape is formed by connecting a polymer actuator with a flat plate shape.

FIG. 12A illustrates an initial state of the polymer actuator 60. FIG. 12B illustrates an example in which the polymer actuator 60 in FIG. 12A is driven (deformed). As illustrated in FIG. 12B, the electrode layer 61 is contracted and the electrode layer 62 is expanded, and thus the right portion of the polymer actuator 60 in the drawing is widely opened vertically.

Figure 13:
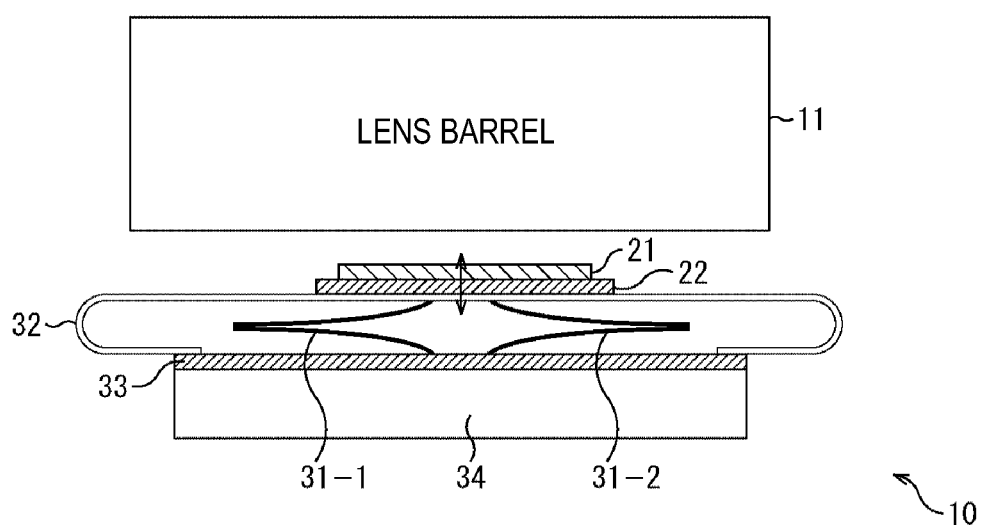
FIG. 13 is a side view illustrating the configuration of the polymer actuators when the polymer actuators in FIG. 12 are used in the camera module in FIG. 1.

FIG. 13 is a side view illustrating the configuration of the polymer actuator when the polymer actuator with the U shape described above with reference to FIGS. 12A and 12B is used as the actuator 31 of the camera module 10 illustrated in FIG. 1. In the example of FIG. 13, actuators 31-1 and 31-2 in which opening sides of two U-shaped polymer actuators are oriented toward the middle are installed.

Here, the opening sides of the two U-shaped polymer actuators are mutually oriented toward the middle, but the opening sides of the two U-shaped polymer actuators may be mutually oriented toward the outside.

In the case of FIG. 13, the opening sides (the right side of the actuator 31-1 and the left side of the actuator 31-2) of the polymer actuators are formed in a vertically opened shape in the initial state. As described above, by causing a potential difference between the two electrode layers of the polymer actuators, the actuators 31-1 and 31-2 are driven and the position of the image sensor unit (the image sensor 21 and the mounting board 22) is shifted to the vertical direction in the drawing.

Figure 14:
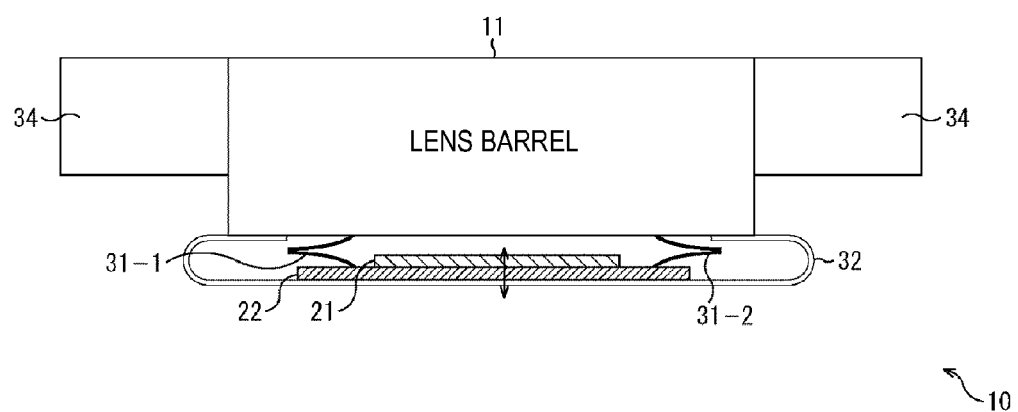
FIG. 14 is a side view illustrating the configuration of the polymer actuators when the polymer actuators in FIG. 12 are used in the camera module in FIG. 7.

FIG. 14 is a side view illustrating the configuration of the polymer actuator when the polymer actuators with the U shape described above with reference to FIGS. 12A and 12B are used as the actuator 31 of the camera module 10 illustrated in FIG. 8. In the example of FIG. 14, the actuators 31-1 and 31-2 in which the opening sides of two U-shaped polymer actuators are oriented toward the middle are installed.

Here, the opening sides of the two U-shaped polymer actuators are mutually oriented toward the middle, but the opening sides of the two U-shaped polymer actuators may be mutually oriented toward the outside.

In the case of FIG. 14, the opening sides (the right side of the actuator 31-1 and the left side of the actuator 31-2) of the polymer actuators are formed in a vertically opened shape in the initial state. As described above, by causing a potential difference between the two electrode layers of the polymer actuators, the actuators 31-1 and 31-2 are driven and the position of the image sensor unit (the image sensor 21 and the mounting board 22) is shifted to the vertical direction in the drawing.

Figure 15:
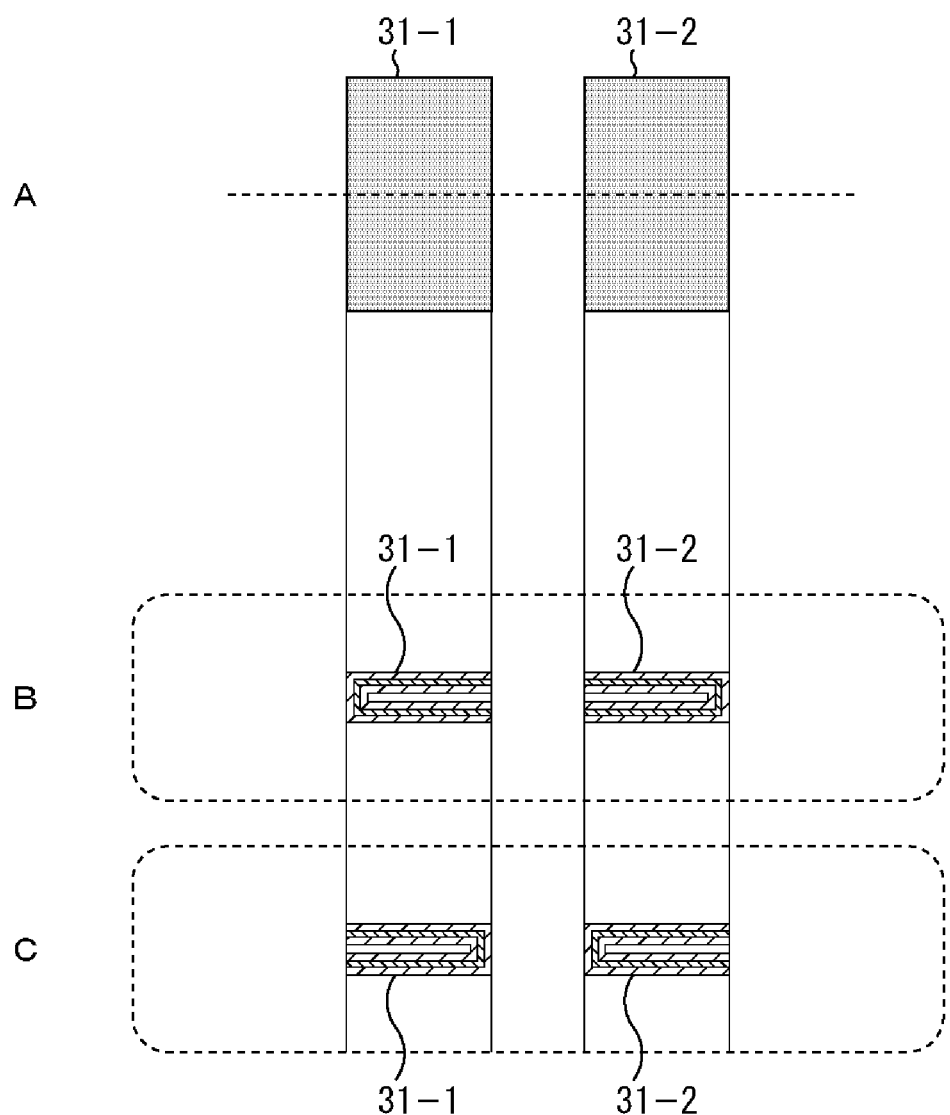
FIGS. 15A to 15C are diagrams illustrating an example of the configuration of the actuators in FIG. 13 or 14.

FIGS. 15A to 15C are diagrams illustrating another example of the configuration of the actuators 31-1 and 31-2 in FIG. 13 or 14.

FIG. 15A is a diagram illustrating the actuators 31-1 and 31-2 in FIG. 13 or 14 when viewed from the optical axis direction. FIG. 15B is a sectional view illustrating the actuators 31-1 and 31-2 in a dotted line of the middle of FIG. 15A. In FIG. 15B, the opening sides of the two U-shaped polymer actuators are mutually oriented toward the middle.

FIG. 15C is a sectional view illustrating another example of the actuators 31-1 and 31-2 in the dotted line of the middle of FIG. 15A. In FIG. 15C, the opening sides of the two U-shaped polymer actuators are mutually oriented toward the outside.

In the examples described above with reference to FIGS. 13 and 14, the examples in which the actuator 31 of the camera module 10 is configured by disposing two polymer actuators have been described. However, the actuator 31 of the camera module 10 may be configured by disposing three or more polymer actuators.

Figure 16:
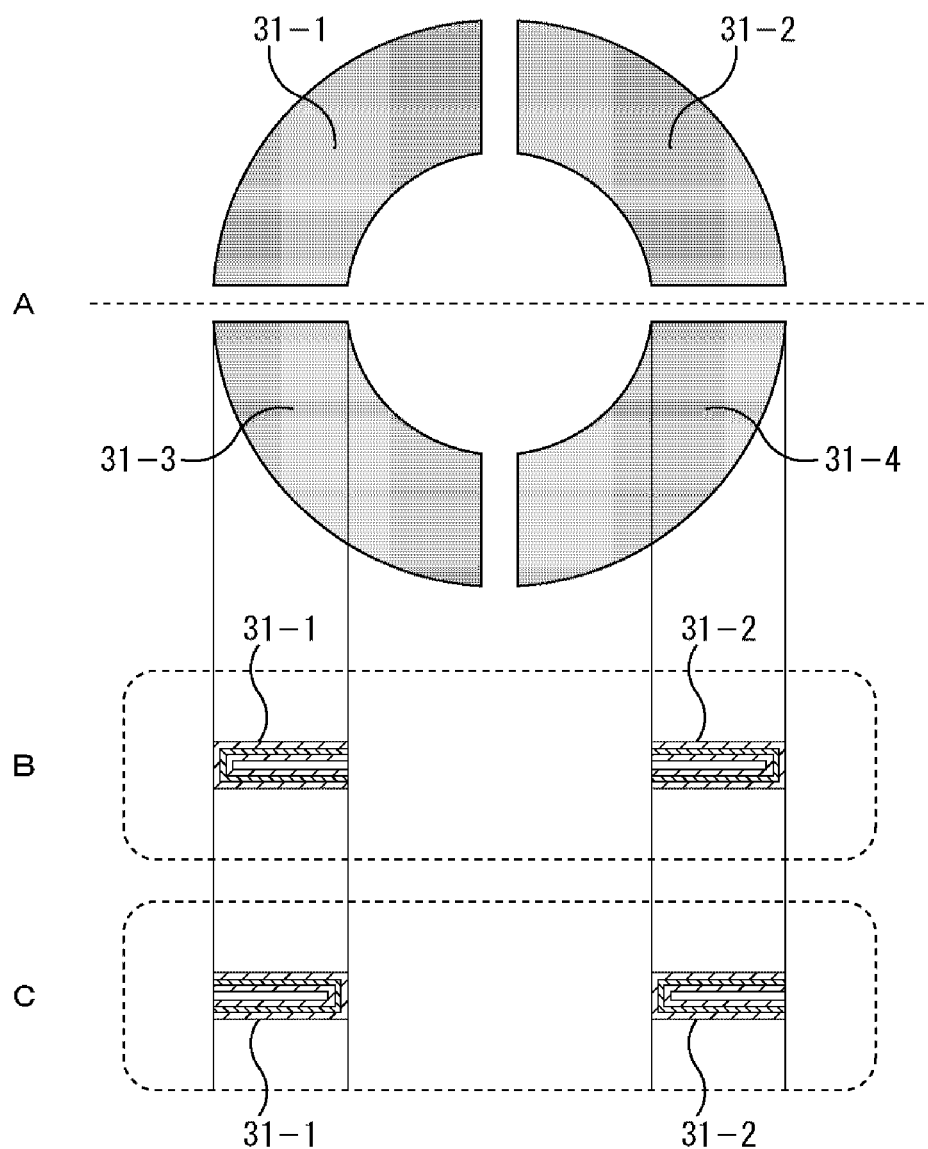
FIGS. 16A to 16C are diagrams illustrating an example of a configuration of four polymer actuators when the four polymer actuators are disposed in a circular form.

For example, the actuator 31 of the camera module 10 may be configured by disposing four polymer actuators in a circular form. FIGS. 16A to 16C are diagrams illustrating an example of the configuration of four polymer actuators, when the four polymer actuators are disposed in a circular form. In this example, the actuator 31 of the camera module 10 is configured by arranging actuators 31-1 to 31-4 with an arc shape side by side.

FIG. 16A is a diagram illustrating the actuators 31-1 to 31-4 when viewed from the optical axis direction. FIG. 16B is a sectional view illustrating the actuator 31-1 (or the actuator 31-3) and the actuator 31-2 (or the actuator 31-4) in a dotted line of the middle of FIG. 16A. In FIG. 16B, the opening sides of the two U-shaped polymer actuators are mutually oriented toward the middle.

FIG. 16C is a sectional view illustrating another example of the actuator 31-1 (or the actuator 31-3) and the actuator 31-2 (or the actuator 31-4) in the dotted line of the middle of FIG. 16A. In FIG. 16C, the opening sides of the two U-shaped polymer actuators are mutually oriented toward the outside.

Figure 17:
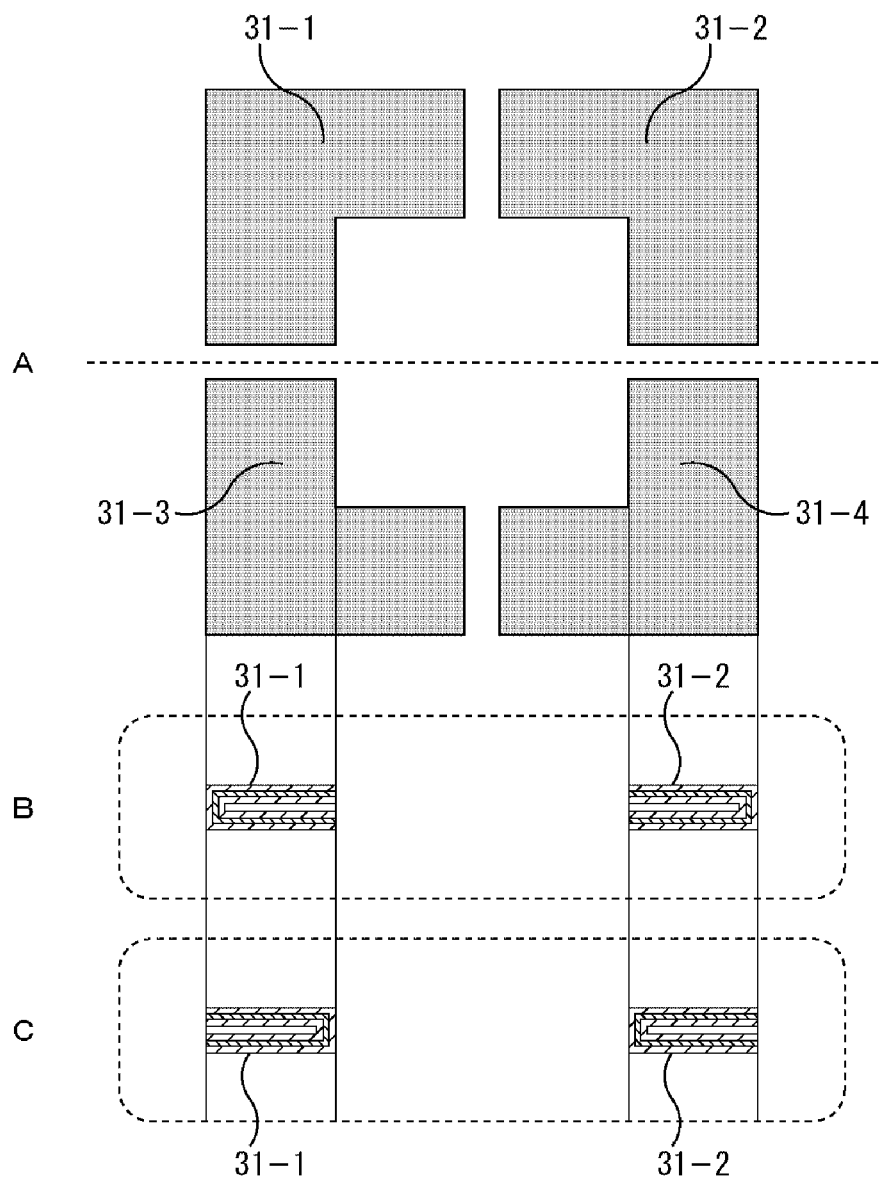
FIGS. 17A to 17C are diagrams illustrating an example of a configuration of four polymer actuators when the four polymer actuators are disposed in a rectangular form.

In FIGS. 16A to 16C, the example in which the four polymer actuators are disposed in the circular form has been described. However, for example, the actuator 31 of the camera module 10 may be configured by disposing four polymer actuators in a rectangular form. FIGS. 17A to 17C are diagrams illustrating an example of the configuration of the four polymer actuators when the four polymer actuators are disposed in the rectangular form. In this example, the actuator 31 of the camera module 10 is configured by arranging actuators 31-1 to 31-4 with a perpendicularly curved hook shape side by side.

FIG. 17A is a diagram illustrating the actuators 31-1 to 31-4 when viewed from the optical axis direction. FIG. 17B is a sectional view illustrating the actuator 31-1 (or the actuator 31-3) and the actuator 31-2 (or the actuator 31-4) in a dotted line of the middle of FIG. 17A. In FIG. 17B, the opening sides of the two U-shaped polymer actuators are mutually oriented toward the middle.

FIG. 17C is a sectional view illustrating another example of the actuator 31-1 (or the actuator 31-3) and the actuator 31-2 (or the actuator 31-4) in the dotted line of the middle of FIG. 17A. In FIG. 17C, the opening sides of the two U-shaped polymer actuators are mutually oriented toward the outside.

For example, as illustrated in FIGS. 16A to 16C or 17A to 17C, the actuators 31-1 to 31-4 can be independently driven by dividing the actuator 31 of the camera module 10 into four polymer actuators. For example, tilt control on the imaging surface of the image sensor 21 can be performed by independently controlling the actuators 31-1 to 31-4. For example, feedback control on a position and tilt of the imaging surface can be performed by combining the position of the imaging surface, a tilt detector, and the like.

The examples in which the actuator 31 is divided into two or four actuators have been described. However, numbers of divisions other than two and four may be used according to the direction, accuracy, or the like of the tilt control.

Figure 18:
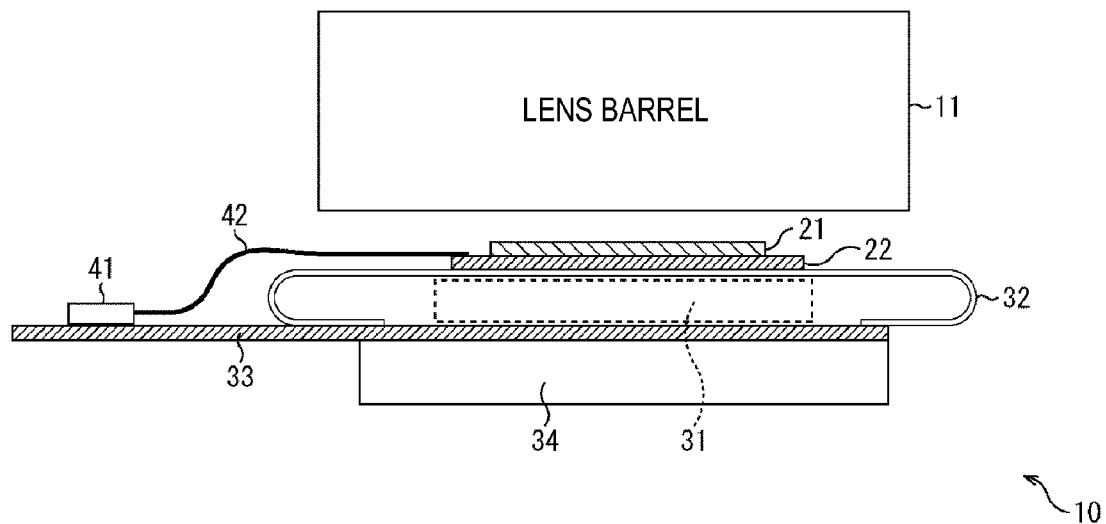
FIG. 18 is a diagram illustrating an example of electric connection between the image sensor unit and the motherboard.

In the camera module 10, it is necessary to electrically connect the mounting board 22 of the image sensor unit 12 and the motherboard 33 to each other. FIG. 18 is a diagram illustrating electric connection between the image sensor unit 12 and the motherboard 33 in the camera module 10 to which the present technology is applied. Here, the electric connection in the camera module 10 illustrated in FIG. 1 will be described as an example.

In FIG. 18, a connector 41 is installed on the motherboard 33 and a left end portion of a flexible board 42 in the drawing connected to the mounting board 22 is coupled with the connector 41. By doing so, various signals are transmitted and received between the mounting board 22 and the motherboard 33 via a plurality of signal lines disposed inside the flexible board 42.

When the mounting board 22 is electrically connected to the motherboard 33 via the flexible board 42, as illustrated in FIG. 18, it is necessary to elastically deform the flexible board 42 together with the heat radiation member 32 at the time of the driving of the actuator 31. In FIG. 18, the flexible board 42 is installed on only the left side in the drawing. However, for example, a flexible board may also be installed on the right side in the drawing to balance the entire rigidity.

In recent years, with an increase in the number of pixels and high-speed processing of image data in a camera module, the number of signal lines used to transmit and receive signals between the mounting board 22 and the motherboard 33 also tends to increase. Therefore, the flexible board 42 tends to be enlarged and the rigidity of the flexible board 42 tends to increase by internal signal lines.

For example, in order to avoid the large size and high rigidity of the flexible board 42, some of the signals transmitted and received between the mounting board 22 and the motherboard 33 may be transmitted and received wirelessly by millimeter waves or the like.

Figure 19:
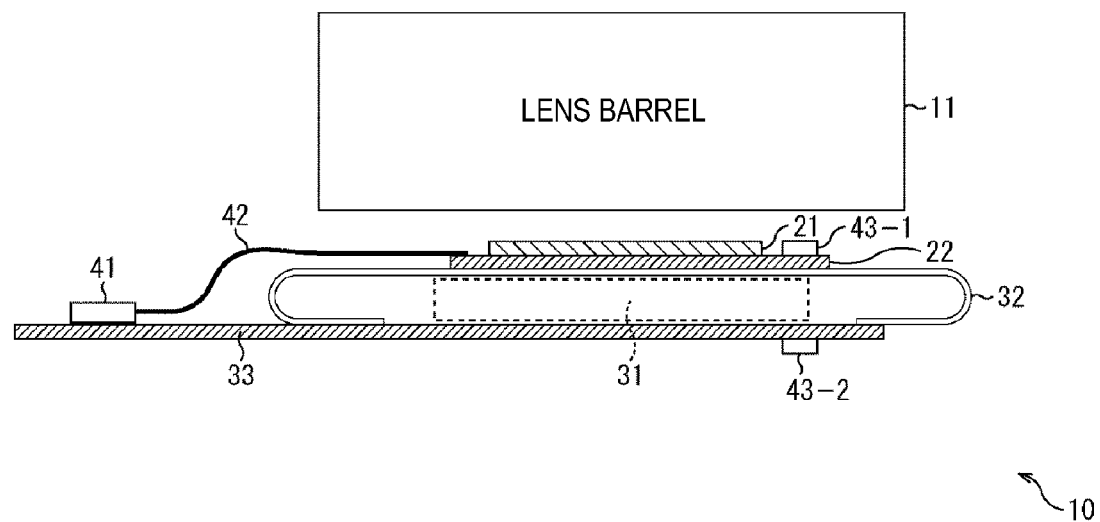
FIG. 19 is a diagram illustrating another example of electric connection between the image sensor unit and the motherboard.

FIG. 19 is a diagram illustrating electric connection between the image sensor unit 12 and the motherboard 33 in the camera module 10 to which the present technology is applied. Here, the electric connection in the camera module 10 illustrated in FIG. 1 will be described as an example.

In FIG. 19, a connector 41 is installed in the motherboard 33 and a left end portion of a flexible board 42 in the drawing connected to the mounting board 22 is coupled with the connector 41. Thus, various signals are transmitted and received between the mounting board 22 and the motherboard 33 via a plurality of signal lines disposed inside the flexible board 42.

In the case of FIG. 19, a wireless communication unit 43-1 is installed on the mounting board 22 and a wireless communication unit 43-2 is installed on the motherboard 33. By doing so, some of the signals transmitted and received between the mounting board 22 and the motherboard 33 are transmitted and received wirelessly by millimeter waves or the like.

By configuring the camera module 10 as in FIG. 19, for example, the camera module 10 is easily miniaturized, compared to the case of FIG. 18. Further, the driving force of the actuator 31 and the rigidity of the flexible board 42 are easily adjusted.

Figure 20:
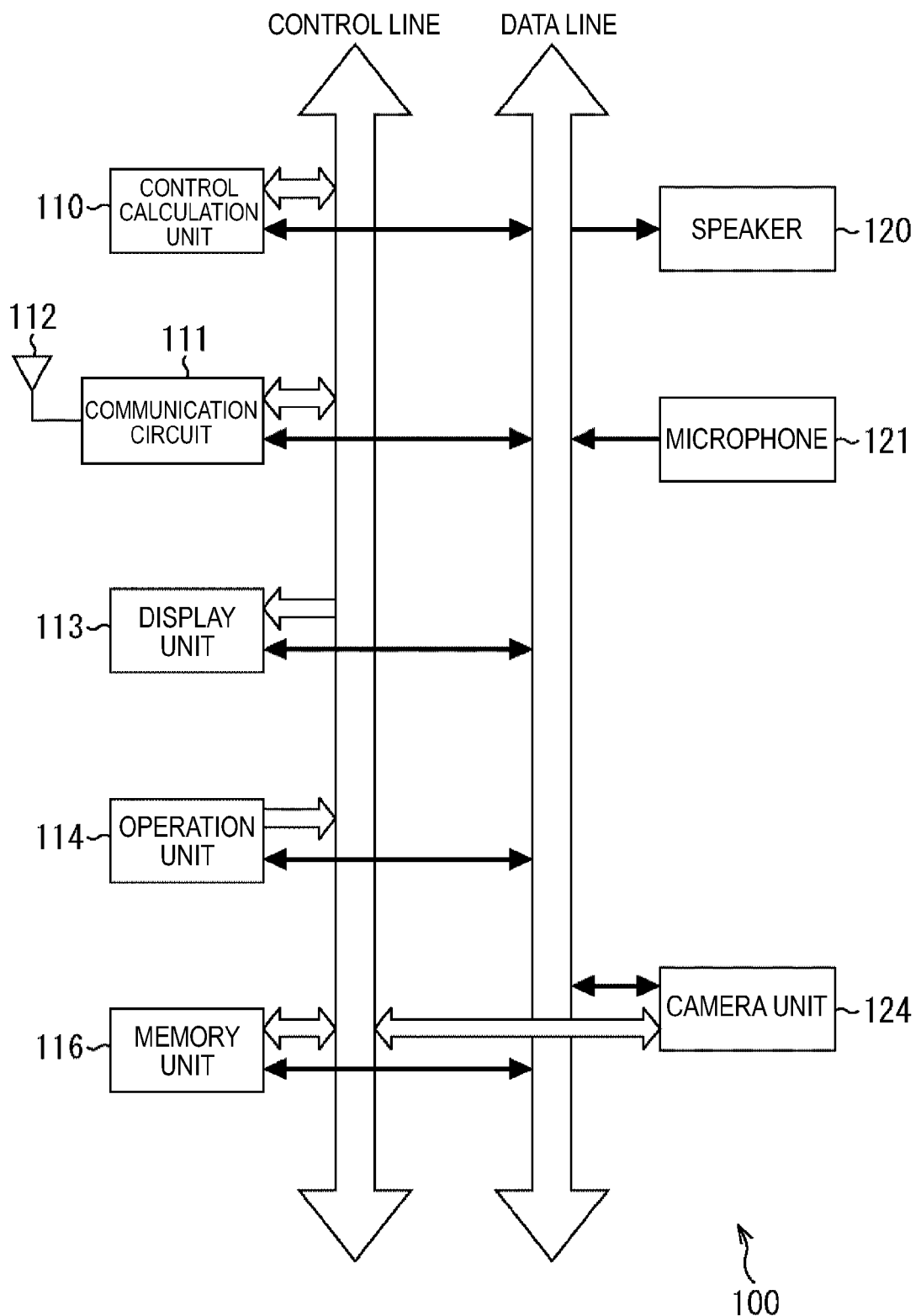
FIG. 20 is a block diagram illustrating an example of the internal configuration of a cellular phone to which the present technology is applied.

As described above, the camera module to which the present technology is applied is mounted on an electronic device such as a cellular phone or a smartphone. FIG. 20 is a block diagram illustrating an example of the internal configuration of a cellular phone to which the present technology is applied.

In a cellular phone 100 illustrated in FIG. 20, a communication antenna 112 is, for example, a built-in antenna, and transmits and receives a signal radio wave through packet communication such as a telephone call or an electronic mail. A communication circuit 111 performs frequency conversion, modulation, demodulation, and the like of a transmitted and received signal.

A speaker 120 is an earpiece speaker installed in the cellular phone 100 or a speaker that outputs a ringer sound (incoming sound), an alarm sound, or the like. The speaker converts an audio signal supplied from a control calculation unit 110 into an acoustic wave and outputs the acoustic wave to the air.

A microphone 121 is a microphone for a mouthpiece and collection of an external sound. The microphone converts an acoustic wave into a sound signal and transmits the sound signal to the control calculation unit 110.

A display unit 113 includes, for example, a display device such as a liquid crystal display or an organic EL display and a display driving circuit of the display. For example, the display unit displays various characters or images such as electronic mails on the display based on an image signal supplied from the control calculation unit 110. Further, the display unit displays a photographed image when the photographed image is supplied from a camera unit 124.

An operation unit 114 includes keys such as numerical keys, a speech key, and call-end/power keys, arrow keys installed in the housing of the cellular phone 100, operators such as a shutter button and a horizontal photographing mode switch, and an operation signal generator generating an operation signal when the operator is operated. Further, when the cellular phone 100 includes a touch panel, the touch panel is also included in the operation unit 114.

The camera unit 124 is set as, for example, a functional block corresponding to the above-described camera module 10. That is, the camera module 10 to which the present technology is applied is disposed as the camera unit 124. An image signal photographed by the camera unit 124 is subjected to various kinds of image processing by the control calculation unit 110, and is displayed on a display screen of the display unit 113 or is compressed to be stored in a memory unit 116.

The memory unit 116 includes an internal memory installed inside the cellular phone and a detachably mounted card-shaped memory that stores so-called subscriber identity module (SIM) information or the like. The internal memory includes a read-only memory (ROM) and a random access memory (RAM). The ROM includes a rewritable ROM such as a NAND-type flash memory or an electrically erasable programmable read-only memory (EEPROM). The ROM stores, for example, an operating system (OS) program, a control program used for the control calculation unit 110 to control each unit, various application programs, dictionary data, sound data of incoming sounds, key operation sounds, and the like, and image data photographed by the camera unit 124.

The RAM serves as a work area when the control calculation unit 110 processes various kinds of data and stores data, as necessary.

The control calculation unit 110 includes a central processing unit (CPU) and performs control of communication of the communication circuit 111, audio processing and control of the audio processing, image processing and control of the image processing, control of photographing of the camera unit 124, other various kinds of signal processing and control of each unit, and the like. The control calculation unit 110 executes various control programs or application programs stored in the memory unit 116 and processes various kinds of data associated with the execution.

Although not illustrated, the cellular phone 100 further includes constituent elements of a general cellular phone, such as a current position detection unit that uses Global Positioning System (GPS) satellite radio-waves, a contactless communication unit that performs contactless communication used in a contactless IC card, a battery that supplies power to each unit, a power management IC unit that controls the power, an external memory slot, and a reception tuner unit and an AV codec unit of digital broadcast.

Here, the example in which the camera module to which the present technology is applied is mounted on a cellular phone has been described. However, the camera module to which the present technology is applied may be mounted on various electronic devices such as a smartphone, a tablet-type terminal, a compact digital camera, a digital single-lens reflex camera, a video camera, and a monitoring camera.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A camera module including:
an image sensor unit that includes an image sensor and a mounting board;
a sheet-shaped heat radiation member that comes into contact with a part of the image sensor unit and a component other than the image sensor unit and is elastically deformed so that an imaging surface of the image sensor unit is moved; and
an actuator that elastically deforms the sheet-shaped heat radiation member so that the imaging surface of the image sensor unit is moved.
(2) The camera module according to (1), wherein the sheet-shaped heat radiation member is folded line-symmetrically with reference to an axis parallel to an optical axis of light incident on the imaging surface.
(3) The camera module according to (1) or (2), wherein an incision is formed in a part of the sheet-shaped heat radiation member.
(4) The camera module according to any one of (1) to (3), wherein the component other than the image sensor unit is a motherboard including a signal processing circuit.
(5) The camera module according to any one of (1) to (4), wherein the component other than the image sensor unit is a lens barrel including an optical lens.
(6) The camera module according to any one of (1) to (5), wherein the actuator is disposed on a rear surface side of the imaging surface of the image sensor unit.
(7) The camera module according to (1) to (6), wherein the actuator is a shape-memory alloy or a polymer actuator performing a curvature operation in a thickness direction of the actuator.
(8) The camera module according to (1) to (7), wherein the actuator is divided into a plurality of actuators on a surface parallel to the imaging surface of the image sensor unit and the divided actuators are independently driven.
(9) The camera module according to (1) to (8), wherein the mounting board is electrically connected to a board different from the mounting board via a flexible board.
(10) The camera module according to (9), further including:
a wireless communication unit that wirelessly transmits and receives some of signals transmitted and received between the mounting board and the board different from the mounting board.
(11) An electronic device including:
a camera module that includes
an image sensor unit that includes an image sensor and a mounting board;
a sheet-shaped heat radiation member that comes into contact with a part of the image sensor unit and a component other than the image sensor unit and is elastically deformed so that an imaging surface of the image sensor unit is moved; and
an actuator that elastically deforms the sheet-shaped heat radiation member so that the imaging surface of the image sensor unit is moved.

The present disclosure contains subject matter related to that disclosed in Japanese Priority Patent Application JP 2012-186140 filed in the Japan Patent Office on Aug. 27, 2012, the entire content of which is hereby incorporated by reference.

What is claimed is:
1. A camera module comprising:
an image sensor unit that includes an image sensor and a mounting board;
a sheet-shaped heat radiation member that includes a first portion configured to come into contact with a part of the image sensor unit and a second portion configured to come into contact with a motherboard, wherein the sheet-shaped heat radiation member is configured to elastically deform so that the first portion of the sheet-shaped heat radiation member and an imaging surface of the image sensor unit are moved in a direction of an optical axis of light incident on the imaging surface; and an actuator surrounded by the sheet-shaped heat radiation member, wherein the actuator is configured to elastically deform the sheet-shaped heat radiation member so that the imaging surface of the image sensor unit is moved.

2. The camera module according to claim 1, wherein the sheet-shaped heat radiation member is folded line-symmetrically, with reference to an axis parallel to the optical axis of light incident on the imaging surface, to surround the actuator.

3. The camera module according to claim 1, wherein an incision is formed in a part of the sheet-shaped heat radiation member.

4. The camera module according to claim 1, wherein the motherboard includes a signal processing circuit.

5. The camera module according to claim 1, wherein the sheet-shaped heat radiation member is in contact with a lens barrel including an optical lens.

6. The camera module according to claim 1, wherein the actuator is disposed on a rear surface side of the imaging surface of the image sensor unit.

7. The camera module according to claim 1, wherein the actuator is a shape-memory alloy or a polymer actuator performing a curvature operation in a thickness direction of the actuator.

8. The camera module according to claim 1, wherein the actuator is divided into a plurality of actuators on a surface parallel to the imaging surface of the image sensor unit and the plurality of actuators are independently driven.

9. The camera module according to claim 1, wherein the mounting board is electrically connected to a board different from the mounting board via a flexible board.

10. The camera module according to claim 9, further comprising:

a wireless communication unit configured to wirelessly transmit and receive some of signals transmitted and received between the mounting board and the board different from the mounting board.

11. An electronic device comprising:

a camera module that includes an image sensor unit that includes an image sensor and a mounting board;

a sheet-shaped heat radiation member that includes a first portion configured to come into contact with a part of the image sensor unit and a second portion configured to come into contact with a lens barrel, wherein the sheet-shaped heat radiation member is configured to elastically deform so that the first portion of the sheet-shaped heat radiation member and an imaging surface of the image sensor unit are moved in a direction of an optical axis of light incident on the imaging surface; and an actuator surrounded by the sheet-shaped heat radiation member, wherein the actuator is configured to elastically deform the sheet-shaped heat radiation member so that the imaging surface of the image sensor unit is moved.

12. The camera module according to claim 1, wherein the imaging surface of the image sensor unit is moved in the direction of the optical axis of light incident on the imaging surface.

13. The camera module according to claim 1, wherein the imaging surface of the image sensor unit is moved to shift the image sensor either towards a lens barrel of the camera module or away from the lens barrel.

14. The camera module according to claim 1, wherein the actuator includes a first electrode layer, a second electrode layer, and an electrolyte layer between the first electrode layer and the second electrode layer.

15. The camera module according to claim 14, wherein the actuator expands or contracts in the direction of the optical axis of light incident on the imaging surface by applying a potential difference between the first electrode layer and the second electrode layer.

16. The camera module according to claim 15, wherein the sheet-shaped heat radiation member is configured to elastically deform in an event the actuator is expanded or contracted in the direction of the optical axis.

* * * * *